(12) United States Patent
Suminoe et al.

(10) Patent No.: US 8,111,371 B2
(45) Date of Patent: Feb. 7, 2012

(54) ILLUMINATION DEVICE AND LIQUID CRYSTAL DISPLAY DEVICE

(75) Inventors: Shinji Suminoe, Osaka (JP); Tomohiko Yamamoto, Osaka (JP); Akira Tomiyoshi, Osaka (JP); Naoto Inoue, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 183 days.

(21) Appl. No.: 12/599,837

(22) PCT Filed: Jul. 2, 2008

(86) PCT No.: PCT/JP2008/062003
§ 371 (c)(1),
(2), (4) Date: Nov. 12, 2009

(87) PCT Pub. No.: WO2009/016913
PCT Pub. Date: Feb. 5, 2009

(65) Prior Publication Data
US 2010/0271565 A1    Oct. 28, 2010

(30) Foreign Application Priority Data

Jul. 27, 2007    (JP) ................................. 2007-196670

(51) Int. Cl.
*G02F 1/1333*    (2006.01)
(52) U.S. Cl. .............................. 349/161; 362/294; 349/1
(58) Field of Classification Search .................. 349/151, 349/161, 61, 69; 362/612, 294; 345/80–82; 250/553
See application file for complete search history.

(56) References Cited

U.S. PATENT DOCUMENTS

| 6,998,594 | B2 * | 2/2006 | Gaines et al. .................. 250/205 |
| 7,638,754 | B2 * | 12/2009 | Morimoto et al. ............. 250/226 |
| 7,868,969 | B2 * | 1/2011 | Morimoto ........................ 349/61 |
| 2003/0234342 | A1 | 12/2003 | Gaines et al. | |
| 2004/0051111 | A1 | 3/2004 | Ota et al. | |
| 2004/0090174 | A1 | 5/2004 | Tasch et al. | |
| 2005/0077532 | A1 | 4/2005 | Ota et al. | |
| 2005/0082574 | A1 | 4/2005 | Tasch et al. | |

(Continued)

FOREIGN PATENT DOCUMENTS
EP    1 619 656 A2    1/2006
(Continued)

OTHER PUBLICATIONS

Official Communication issued in International Patent Application No. PCT/JP2008/062003, mailed on Sep. 30, 2008.

*Primary Examiner* — Eric Wong
(74) *Attorney, Agent, or Firm* — Keating & Bennett, LLP

(57) ABSTRACT

An illumination device includes an LED package, an LED driver including an FET, and a thermistor disposed on a substrate. A plurality of such LED packages are disposed on the substrate such that a first area and a second area, each determined by vertices corresponding to LED packages, are defined on the substrate. The thermistor is disposed in the first area, and the FET is disposed in the second area, which is outside of the first area. The thermistor detects a temperature in the first area. Such a configuration allows the thermistor to detect, in accordance with the temperature in the area, the temperature of heat transferred from the LED packages, without being affected by heat generated by the FET. This makes it possible to efficiently make temperature corrections to stabilize color temperature and luminance.

7 Claims, 11 Drawing Sheets

U.S. PATENT DOCUMENTS

| | | |
|---|---|---|
| 2005/0162069 A1 | 7/2005 | Ota et al. |
| 2006/0082523 A1 | 4/2006 | Guo et al. |
| 2006/0267031 A1 | 11/2006 | Tasch et al. |
| 2007/0035706 A1 | 2/2007 | Margulis |
| 2007/0064421 A1 | 3/2007 | Baba |
| 2007/0076431 A1 | 4/2007 | Atarashi et al. |
| 2007/0090383 A1 | 4/2007 | Ota et al. |
| 2008/0061717 A1 | 3/2008 | Bogner et al. |
| 2009/0021181 A1 | 1/2009 | Brune et al. |
| 2010/0155761 A1 | 6/2010 | Ota et al. |

FOREIGN PATENT DOCUMENTS

| | | |
|---|---|---|
| JP | 2000-89717 A | 3/2000 |
| JP | 2001-043728 A | 2/2001 |
| JP | 2005-116182 A | 4/2005 |
| JP | 2005-531140 A | 10/2005 |
| JP | 2006-147373 A | 6/2006 |
| RU | 2251761 C2 | 5/2005 |
| WO | 2006/034668 A2 | 4/2006 |
| WO | 2006/111133 A1 | 10/2006 |

* cited by examiner

ILLUMINATION DEVICE AND LIQUID CRYSTAL DISPLAY DEVICE

BACKGROUND OF THE INVENTION

1. Field of the Invention

The present invention relates to illumination devices and liquid crystal display devices, especially to an illumination device and a liquid crystal display device, each of which is stable in color temperature and luminance.

2. Description of the Related Art

Cold cathode fluorescent lamps (hereinafter referred to as "CCFLs") have been conventionally used as backlights incorporated in back of liquid crystal panels of transmissive liquid crystal display devices used in laptop personal computers, computer monitors and television receivers. However, in recent years, due to the amelioration, among others, of the light efficiency of light-emitting diodes (hereinafter referred to as "LEDs") and to the reduction of their cost, LEDs are increasingly being used as backlights of liquid crystal display devices.

LED backlight devices can either be of the direct type, where LEDs are arrayed below the back surface of a display panel of a liquid crystal panel or the like, or of the edge-light type, where a light guide plate is used. In general, the former is higher in efficiency in the use of light than the latter. The former also allows a reduction in weight.

LED backlight devices can, among others, either include an array of white LEDs that emits a white illuminating light, or include an array of LEDs of three colors, namely red (R), green (G), and blue (B), whose emitted lights are mixed to give a white light. It should be noted here that white LEDs are of a type that gives a white light by combining RGB fluorescent materials with a short-wavelength LED chip, of a type that generates a white light by combining a yellow fluorescent material with a blue LED chip, of a type that generates a white light as a mixture of lights emitted by LED chips of three colors (RGB), or of a type that generates a white light as a mixture of lights emitted by LED chips of two complementary colors.

In general, LEDs have characteristics such that their relative luminance tends to decrease with an increase in ambient temperature, i.e., have such a problem that their light efficiency changes depending on fluctuations in ambient temperature. In order to address this problem, the development of an LED backlight device which is not affected by fluctuations in ambient temperature and which maintains fixed light efficiency is in progress.

A specific example is disclosed in Japanese Patent Application Publication No. 2006-147373 A, discloses a backlight device including: a light source having a plurality of light-emitting diodes; a driving control section that drives the plurality of light-emitting diodes; and a temperature sensor that detects the temperatures of the light-emitting diodes. In the backlight device, a first preset upper limit temperature that is not higher than the maximum rated temperatures of the light-emitting diodes and a second preset upper limit temperature that is lower than the first preset upper limit temperature are preset in the driving control section. Japanese Patent Application Publication No. 2006-147373 A describes that the driving control section reduces an amount of driving electric current in cases where a temperature detected by the temperature sensor is not lower than the first preset upper limit temperature, fixes the amount of driving electric current at the present value in cases where the temperature detected by the temperature sensor is lower than the first preset upper limit temperature and higher than the second preset upper limit temperature, and increases the amount of driving electric current in cases where the present amount of driving electric current is lower than a preset value and in cases where the temperature detected by the temperature sensor is not higher than the second preset upper limit temperature. Further, Japanese Patent Application Publication No. 2006-147373 A mentions that the above-described configuration alleviates deterioration in characteristics of and/or failures in the light-emitting diodes used as the light source for the backlight.

Because such a conventional backlight device as disclosed in Japanese Patent Application Publication No. 2006-147373 A equally illuminates a whole area, there is a certain trend in variations in temperature among the LEDs. For this reason, the deterioration in characteristics of the LEDs can be reduced to a certain degree by presetting a temperature that is used as a benchmark when the driving control section controls the driving of the LEDs.

In recent years, however, area-active backlights have been attracting attention as illumination devices for use in display devices and the like. An area-active backlight is a backlight divided into small areas, thus allowing the control of the luminance of the backlight for each of the separate small areas in accordance with the gradations of an image displayed on a liquid crystal display device. In such an area-active backlight, the whole area is not equally illuminated; the emission of the light source (i.e., LEDs) is controlled for each area. In other words, for example, in the case of use of an area-active backlight in a display device, the LEDs of each area vary in electric power inputted thereto, depending on video signals. For this reason, the distribution of temperature within the backlight is always not constant, and varies depending on video signals. Accordingly, the following problem arises: namely, based on the preset temperature, a stable color temperature and a stable luminance cannot be maintained by merely controlling driving in accordance with a preset temperature. In other words, it is necessary to detect the temperature of each individual LED of each area in real time and to control the driving of the backlight device in accordance with that temperature.

However, a technique for appropriately detecting the temperature of each individual LED of each area in an area-active backlight and controlling the driving of the area active backlight in accordance with that temperature remains undeveloped.

SUMMARY OF THE INVENTION

In view of the above-described problems, preferred embodiments of the present invention provide an illumination device and a liquid crystal display device, each of which is stable in color temperature and luminance.

According to a preferred embodiment of the present invention, an illumination device includes a substrate, a plurality of luminous bodies disposed on the substrate, a driving section arranged to drive the plurality of luminous bodies, and a temperature detecting section disposed in an area surrounded by the plurality of luminous bodies, wherein the driving section is disposed outside of a polygonal area determined by vertices corresponding to the plurality of luminous bodies surrounding the temperature detecting section.

According to another preferred embodiment of the present invention, an illumination device includes a substrate, a plurality of luminous bodies disposed on the substrate, a driving section arranged to drive the plurality of luminous bodies, and a temperature detecting section disposed in an area surrounded by the plurality of luminous bodies, wherein a plurality of polygonal areas determined by vertices corresponding to the luminous bodies are located on the substrate, the driving section and the temperature detecting section are disposed in different ones of the polygonal areas, and the temperature detecting section is arranged to detect a temperature of the substrate in the polygonal area in which the temperature detecting section is disposed.

According to the above configuration, the luminous bodies, the driving section, and the temperature detecting section are preferably disposed on the same substrate. Further, a plurality of such luminous bodies are disposed on the substrate, whereby a plurality of polygonal areas determined by vertices corresponding to the luminous bodies are disposed on the substrate. It should be noted that the "polygonal areas determined by vertices corresponding to the luminous bodies" means that the luminous bodies are positioned at the vertices of the polygonal areas and that an area surrounded by line segments connecting the luminous bodies serving as the vertices is polygonal.

When in operation, the driving section generates heat and causes an increase in temperature of a specific area of the substrate. In the area of the substrate in which there is an increase in temperature due to the heat generated by the driving section, it is difficult to accurately detect the temperature of heat transferred from the luminous bodies. In this configuration, the driving section is disposed outside of a polygonal area determined by vertices corresponding to luminous bodies surrounding the temperature detecting section. Preferably, the driving section and the temperature detecting section are disposed in different polygonal areas (i.e., in different "polygonal areas" among the plurality of "polygonal areas"). In other words, the temperature detecting section is disposed on the substrate so as to be in an area that is relatively small in temperature change that is caused by the heat generated by the driving section during operation. Then, the temperature detecting section detects the temperature in the polygonal area in which the temperature detecting section is disposed. For this reason, the temperature detecting section can accurately detect the temperature in the polygonal area in which the temperature detecting section is disposed, without being affected by the heat generated by the driving section.

The temperature in the polygonal area in which the temperature detecting section is disposed is correlated with the temperatures of the luminous bodies. Accordingly, this configuration makes it possible to estimate the temperatures of the luminous bodies in accordance with temperature data detected by the temperature detecting section. Hence, it is possible to efficiently make temperature corrections and to exhibit a stable color temperature and luminance.

Further, the liquid crystal display device includes the illumination device as a backlight.

The illumination device can efficiently make temperature corrections, thus exhibiting a stable color temperature and luminance. Accordingly, the above configuration makes it possible to achieve a liquid crystal display device to be stable in color temperature and luminance.

Other features, elements, steps, characteristics and advantages of the present invention will become more apparent from the following detailed description of preferred embodiments of the present invention with reference to the attached drawings.

DETAILED DESCRIPTION OF THE PREFERRED EMBODIMENTS

Preferred embodiments of the present invention are described below with reference to FIG. 1A through FIG. 11. The present invention, however, is not limited to the preferred embodiments described below.

Figure 5:
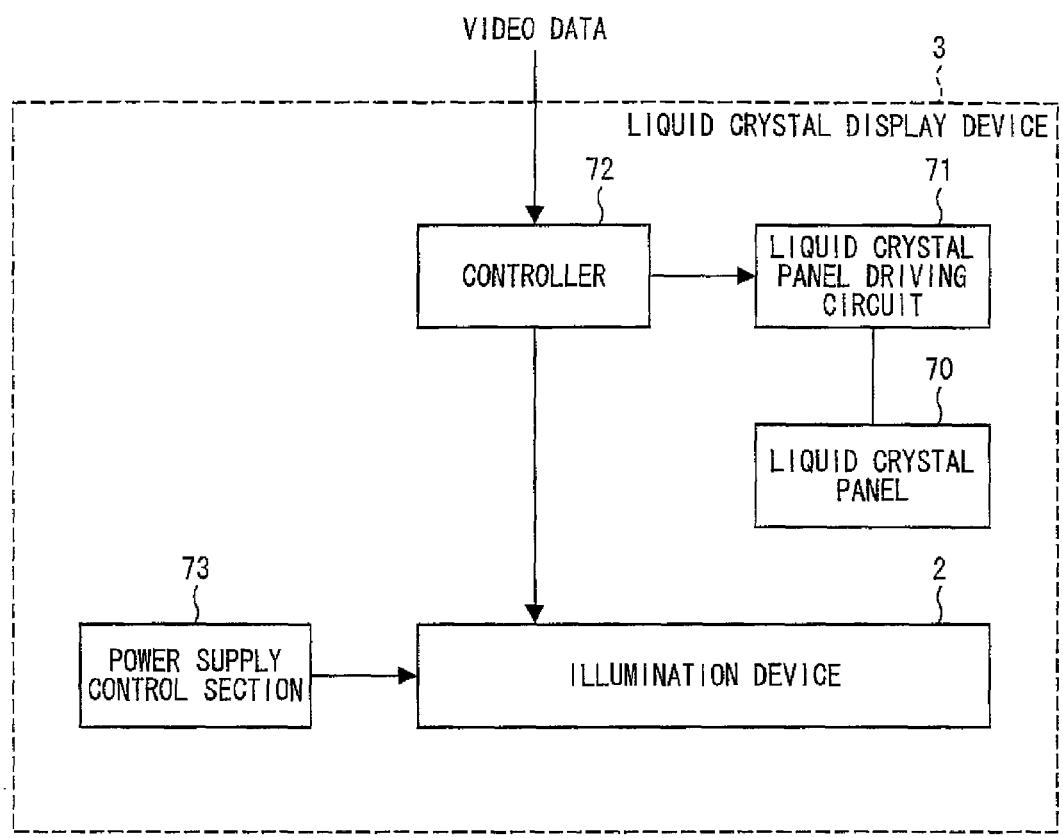
FIG. 5 is a block diagram illustrating the configuration of a driving circuit of a liquid crystal display device in accordance with a preferred embodiment of the present invention.

As illustrated in FIG. 5, a liquid crystal display device 3 in accordance with the present preferred embodiment includes a liquid crystal panel 70, a liquid crystal panel driving circuit 71, a controller 72, an illumination device 2, an optical member (not shown) such as a diffusion plate, and a power supply control section 73. The controller 72 controls the liquid crystal panel driving circuit 71 and the illumination device 2 in accordance with input video data. In response to the control from the controller 72, the liquid crystal display panel driving circuit 71 drives the liquid crystal panel 70, and the illumination device 2 radiates light. The light radiated from the illumination device 2 is supplied to the liquid crystal panel 70 through a diffusion plate (not shown) or the like. Further, the power supply control section 73 controls a power supply system of the liquid crystal display device 3 in accordance with the turning-on and turning-off of the power supply by a user.

Figure 6:
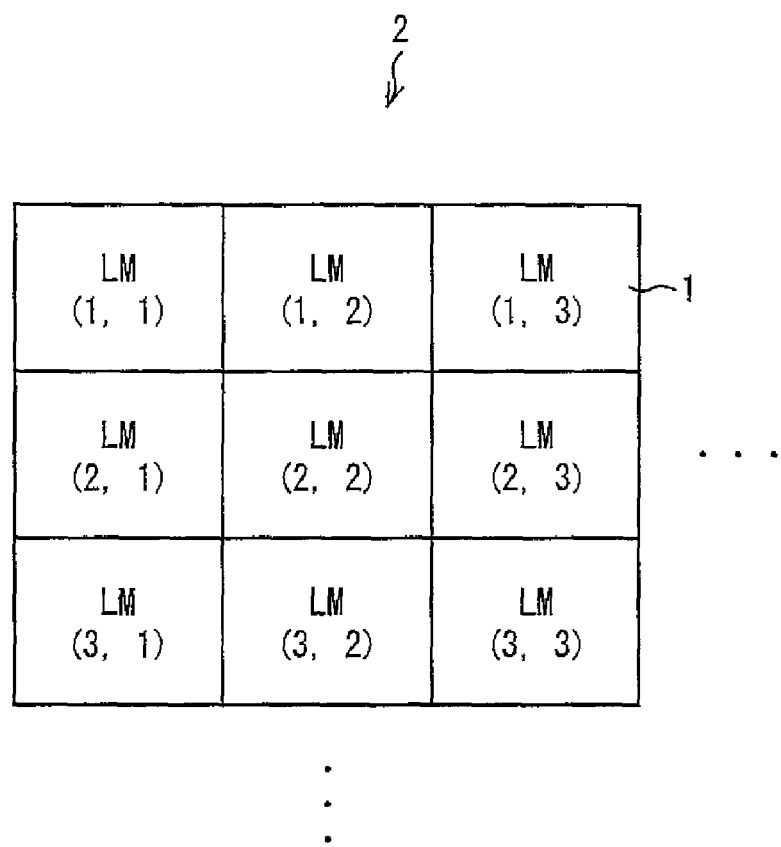
FIG. 6 is a plan view schematically illustrating an arrangement of light source modules in an illumination device in accordance with a preferred embodiment of the present invention.
Figure 7:
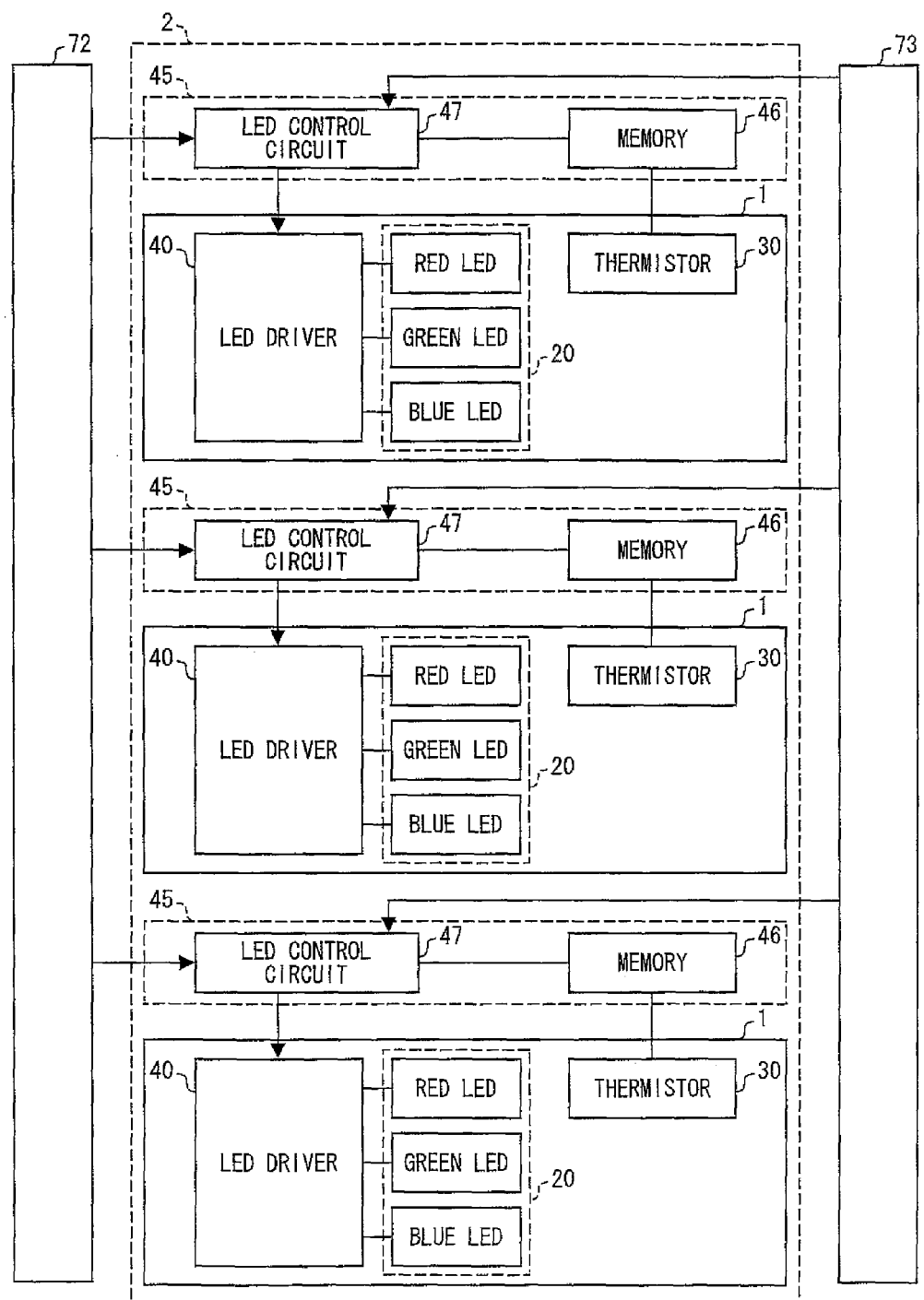
FIG. 7 is a block diagram illustrating an arrangement of a control section and a light source module in an illumination device in accordance with a preferred embodiment of the present invention.

For example, as illustrated in FIG. 6, the illumination device 2 includes a plurality of light source modules (each indicated as "LM" in FIG. 6) 1 (i, j) (i=1, 2 ... n, j=1, 2 ... m, where i and j each indicate a given integer of not less than 1) disposed in a matrix manner. FIG. 7 illustrates a portion of the illumination device 2 (that includes three light source modules 1). More specifically, as illustrated in FIG. 7, the illumination device 2 includes a plurality of light source modules 1 and an LED control section 45. Each of the light source module 1 includes: at least one light-emitting diode package (hereinafter referred to as "LED package") 20 (luminous body) equipped, for example, with one or more red light-emitting diode chips (hereinafter referred to as "red LEDs"), one or more green light-emitting diode chips (hereinafter referred to as "green LEDs"), and one or more blue light-emitting diode chips (hereinafter referred to as "blue LEDs"); at least one thermistor 30 (temperature detecting section, temperature detecting member); and at least one LED driver 40 (driving section). It should be noted that, for convenience of illustration, each of the light source modules 1 of FIG. 7 includes one LED package 20, one thermistor 30, and one LED driver 40.

Figure 1A:
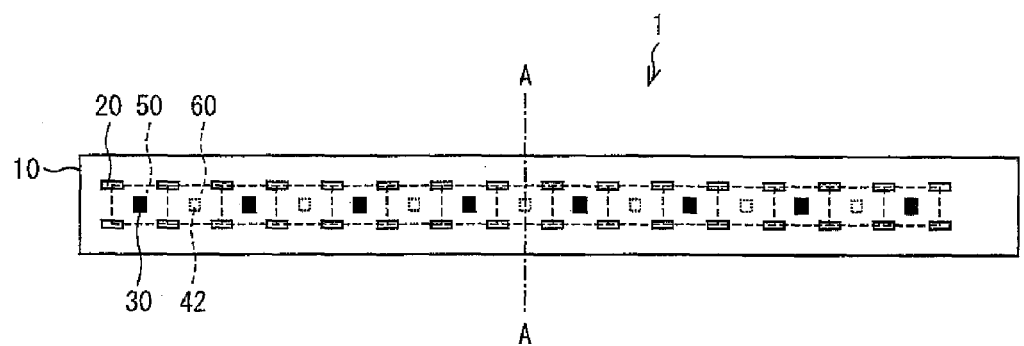
FIG. 1A is a plan view illustrating the configuration of a light source module that is provided in an illumination device in accordance with a preferred embodiment of the present invention.
Figure 1B:
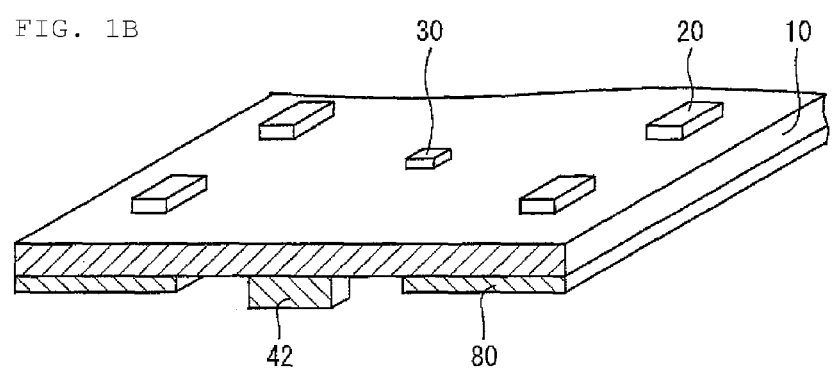
FIG. 1B is an oblique perspective view illustrating the configuration of a relevant portion of the light source module as seen from a cross section of the light source module cut along the line A-A in FIG. 1A.

FIG. 1A is a plan view (top surface view) illustrating the configuration of a light source module 1 that is provided in the illumination device 2. FIG. 1B is an oblique perspective view illustrating the configuration of a relevant portion of the light source module 1 as seen from a cross-section of the light source module 1 cut along the line A-A in FIG. 1A.

As shown in FIGS. 1A and 1B, the light source module 1 preferably includes LED packages 20, thermistors 30, and LED drivers 40. The LED packages 20, the thermistors 30, and the LED drivers 40 are disposed on the same substrate 10, the thermistors 30 being located on the front surface of the substrate. Details about the light source module 1 are omitted in the present paragraph, as they will be explained later in this specification.

Figure 8:
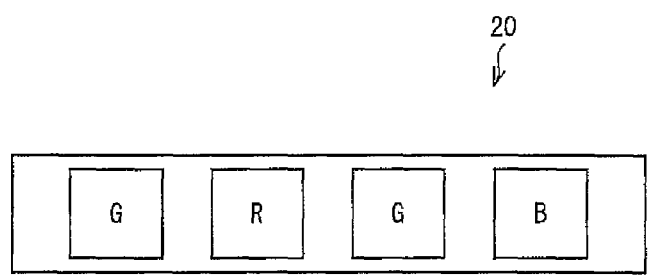
FIG. 8 is a plan view schematically illustrating the configuration of a relevant portion of an LED package that is mounted in an illumination device in accordance with a preferred embodiment of the present invention.

Specifically, the LED packages 20 can each be realized by an LED package equipped with one red LED, two green LEDs, and one blue LED as indicated by the letters R (red), G (green), and B (blue) in FIG. 8. Such an LED package can emit a white light and a light of the color of each of the LEDs by adjusting the ratio of emission among the four LEDs. The present preferred embodiment describes the LED packages 20 as LED packages each configured to have four LEDs contained therein, for example, as shown in FIG. 8. It must be noted, however, that the present preferred embodiment is not limited to such a configuration, and that various types of LED packages disclosed in the prior art can also be used as such LED packages 20. For example, four packages respectively containing the red, green, and blue LEDs can also be used as LED packages 20.

As shown in FIG. 7, the LED control section 45 includes an LED control circuit 47 (LED driving circuit) and a memory 46 containing a look-up table from which a value for correction of the value of output of the LED package 20 is outputted in accordance with the value of the thermistor 30. The LED control section 45 controls the LED driver 40 in accordance with an instruction from the controller 72. In response to the control from the LED control section 45, the LED driver 40 drives the red, green, and blue LEDs, mounted inside of the LED package 20, individually to emit lights.

The following explains a method in accordance with the present preferred embodiment for driving the LEDs in the illumination device 2. Specific examples of the LED driving method include (1) a regulator system shown in FIG. 10 (hereinafter referred to as "first regulator system" for ease of explanation) and (2) a regulator system shown in FIG. 11 (hereinafter referred to as "second regulator system" for ease of explanation). The following describes the LED driving method as either the first regulator system or the second regulator system; however, the present invention is not limited to these two LED driving methods.

Figure 10:
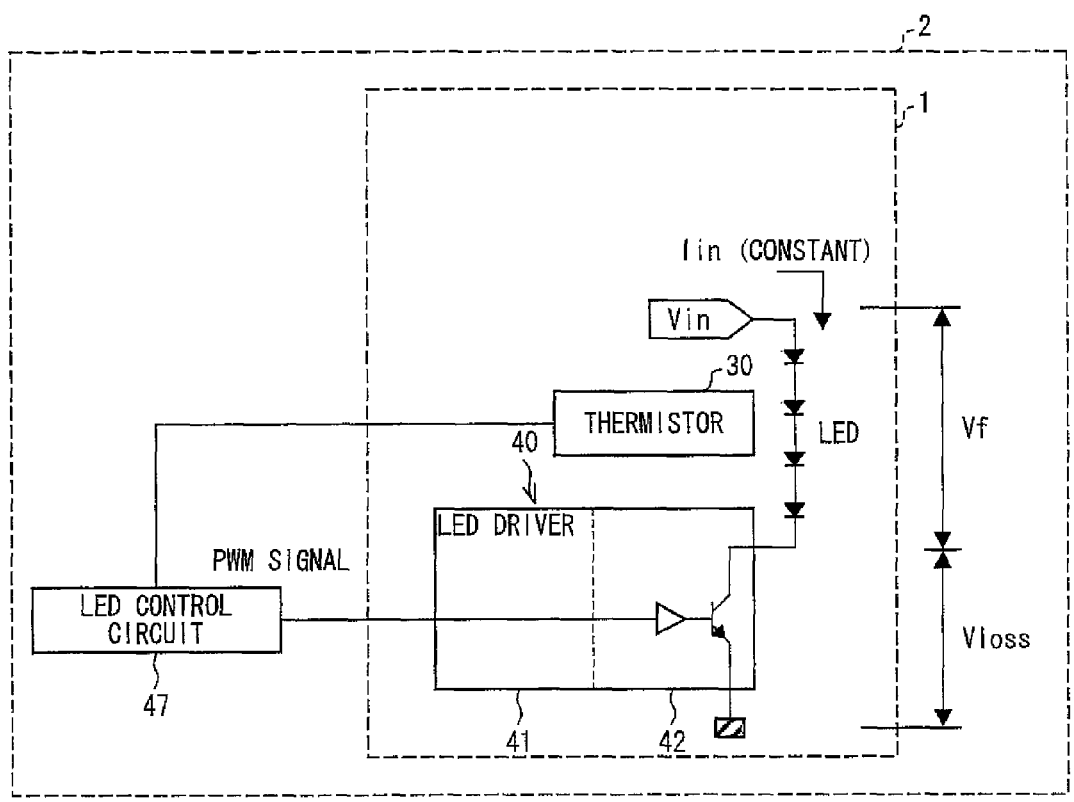
FIG. 10 is a circuit diagram illustrating an example of a circuit arrangement in an illumination device in accordance with a preferred embodiment of the present invention.

First, in the "first regulator system", as shown in FIG. 10, one LED or a plurality of series-connected LEDs (for example, four LEDs in FIG. 10) is/are driven by a constant electric current. At this point, an FET 42 (electric current control transistor, driving section) provided inside of the LED driver 40 is used to adjust an electric current that is applied from a control circuit 41 (driving circuit, driving section) to each LED, whereby the driving of each separate LED can be controlled. The following explains the amount of electric power that is consumed by the LEDs and the LED driver when the LEDs are driven by the first regulator system.

When each LED mounted inside of the LED package 20 is driven by the first regulator system, as shown in FIG. 10, a constant electric current ($I_{in}$) is applied to each of the series-connected LEDs. Even if it is supposed that there are no variations in voltage $V_f$ necessary for applying the electric current $I_{in}$, $V_{loss}$ is about 0.6 V, for example. It is assumed here, for example, that the $V_f$'s of the red LED, two green LEDs, and blue LED of the LED package 20 shown in FIG. 8 are about 2.0 V, about 6.0 V (3.0 V×2), and about 3.0 V, respectively, and the driving currents are about 30 mA, about 25 mA, and about 20 mA, respectively, for example. Further, it is assumed that the variations in $V_f$ of each LED fall within about ±0.1 V, for example. Furthermore, it is assumed that the light source module is realized by such a light source module as shown in FIG. 1A. The light source module 1 shown in FIG. 1A preferably has 32 LED packages 20, for example, disposed on the substrate 10 and each preferably equipped with three sets of LEDs, namely one red LED (one set), two green LEDs (one set), and one blue LED (one set), for example. In other words, the light source module 1 shown in FIG. 1A includes 96 (=32×3) sets of LEDs, for example. The light source module 1 shown in FIG. 1A preferably includes six LED drivers 40, for example. Accordingly, in the light source module 1 shown in FIG. 1A, the 96 sets of LEDs are driven by the six LED drivers 40, for example. That is, one LED driver 40 drives sixteen sets of LEDs, for example. Under the above conditions, each LED package 20 consumes an electric power of about 0.27 W, for example. Accordingly, in consideration of the variations in $V_f$ of each LED, the FET 42 of the LED driver 40 consumes an electric power of not less than about 0.27 W, for example.

Figure 11:
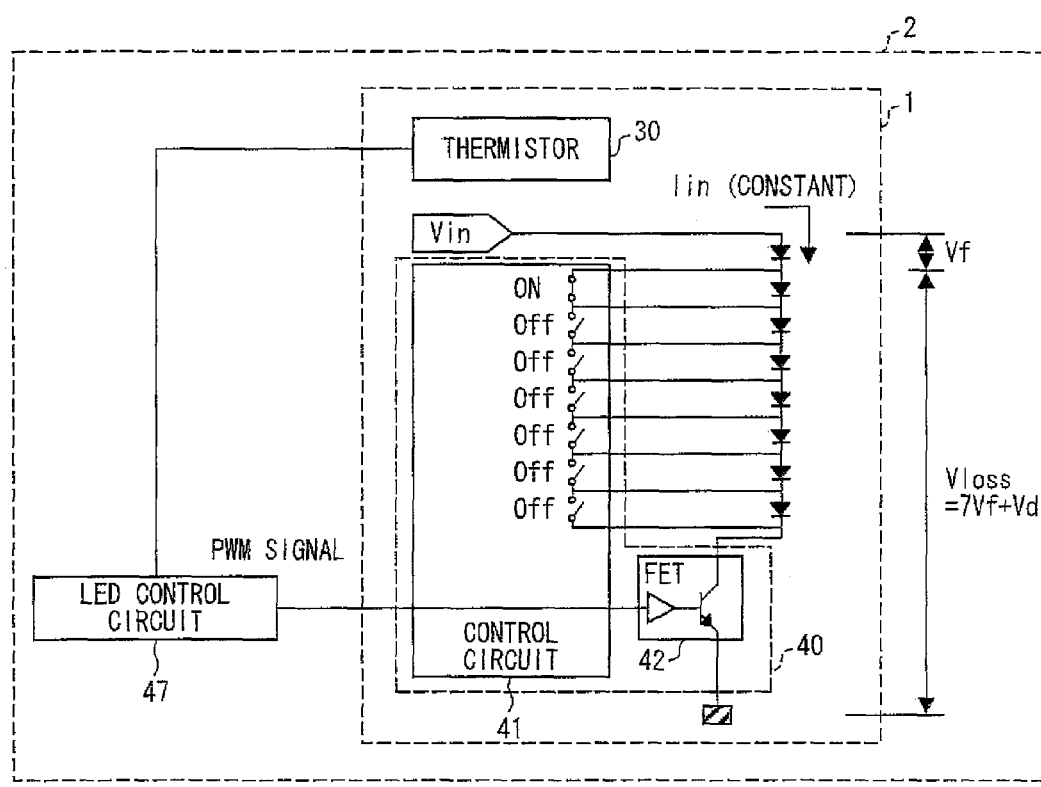
FIG. 11 is a circuit diagram illustrating another example of a circuit arrangement in an illumination device in accordance with a preferred embodiment of the present invention.

Next, the "second regulator system" is explained. In the second regulator system, as shown in FIG. 11, while the plurality of series-connected LEDs (eight LEDs in FIG. 11) are being driven by a constant electric current, a driving voltage is applied only to the LEDs (one LED in FIG. 11) among the plurality of LEDs which needs to be driven to emit light. As for the LEDs that do not need to be driven to emit light, the electric current is diverted by using a switch element (not shown) provided inside of the control circuit 41, whereby the driving voltage is not applied to the LEDs that do not need to be so driven. Further, the control circuit 41 and the FET 42 are separate packages. Accordingly, the driving of each separate LED can be controlled with a high degree of accuracy. The following explains the amount of electric power that is consumed by the LEDs and the LED driver when the LEDs are driven by the second regulator system.

Figure 3:
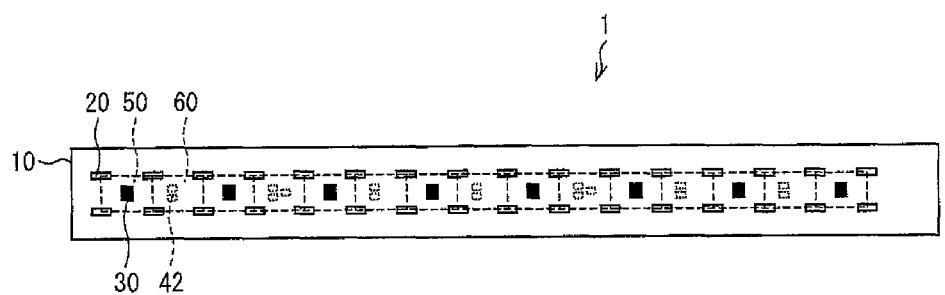
FIG. 3 is a plan view illustrating the configuration of a light source module that is provided in an illumination device in accordance with yet another preferred embodiment of the present invention.

First, it is assumed that the voltages $V_f$ of the red LED, two green LEDs, and blue LED of the LED package 20 shown in FIG. 8 are about 2.0 V, about 6.0 V (3.0 V×2), and about 3.0 V, respectively, and the driving currents are about 30 mA, about 25 mA, and about 20 mA, respectively, for example. Further, it is assumed that the variations in $V_f$ of each LED fall within about ±0.1 V, for example. Furthermore, it is assumed that the light source module 1 is realized by such a light source module as shown in FIG. 3. The light source module 1 shown in FIG. 3 includes such LED packages 20 as shown in FIG. 8, each equipped with four LEDs, namely one red LED, two green LEDs, and one blue LED, for example. Because 32 LED packages 20, for example, are preferably disposed on the substrate 10, a total of 128 LEDs, for example, are preferably disposed on the substrate 10. The light source module shown in FIG. 3 preferably includes sixteen FETs 42, for example, each being mounted as a separate package from an IC (not shown) including two driving circuits. Accordingly, in the light source module 1 shown in FIG. 3, the 128 LEDs are preferably driven and controlled by the sixteen FETs 42, for example. In other words, one FET 42 preferably drives and controls eight LEDs, for example. In this case, when only one of the LEDs is lighted under the second regulator system, the voltages of the remaining seven LEDs are absorbed by the FET 42. In this situation, the FET 42 consumes, at the maximum, as much electric power as would be consumed by seven LEDs. Accordingly, under such conditions, specifically, the maximum amount of electric power that is consumed is about 0.525 W, for example.

As described above, the FET 42 consumes electric power no matter what driving method is used to drive the LEDs. Especially, the FET 42 consumes more electric power in the case of driving by the second regulator system than in the case of driving by the first regulator system. Since the FET 42 consumes electric power, the FET 42 generates heat at the time of operation. In other words, when the illumination device 2 in accordance with the present preferred embodiment is in operation, the LED driver 40 or the FET 42 as well as the LED package 20 generates heat.

Figure 9:
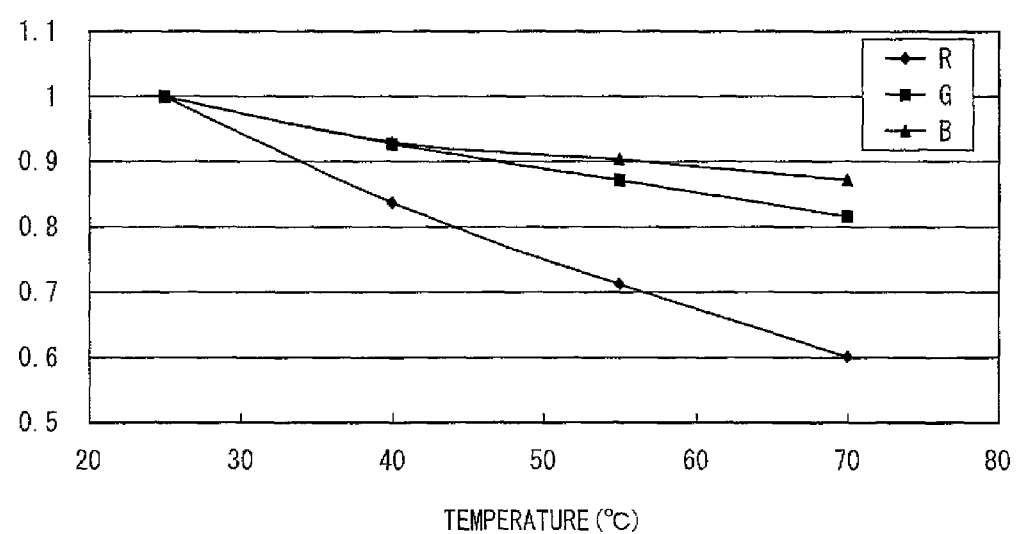
FIG. 9 is a graph showing the temperature characteristics of the luminance of LEDs.

Generally speaking, the luminance of an LED changes depending on the temperature. Specifically, as shown in FIG. 9, the red, green, and blue LEDs decrease in luminance with an increase in temperature. The letters R, G, and B in FIG. 9 indicate the red, green, and blue LEDs, respectively. Accordingly, in order to cause the LEDs to emit light at a stable luminance in the illumination device 2, it is preferable to detect the temperature of the LED package 20 and, based on the temperature, to control the driving of the LED package 20 so as to stabilize the luminance of each of the LEDs mounted in the LED package 20. The illumination device in accordance with the present preferred embodiment preferably uses a thermistor 30 to perform a temperature correction for the luminance of each of the LEDs mounted in the LED package 20.

In other words, in the present preferred embodiment, when the LED control section 45 receives a temperature detected by a thermistor 30 disposed in a polygonal area determined by vertices corresponding to LED packages 20 whose temperatures are to be corrected as will be mentioned later, the LED control section 45 controls the LED packages 20, by which the polygonal area is determined, through the LED driver 40 in accordance with the look-up table mentioned above.

Specifically, the thermistor 30 first detects temperature data that is used as a benchmark for temperature correction of each LED package 20. In other words, in order to obtain an index of the temperature of the LED package 20, the thermistor 30 detects the temperature of the substrate. The thermistor 30 may detect the internal temperature of the substrate and the ambient temperature of the surface of the substrate as well as the surface temperature of the substrate, as long as these temperatures are correlated with the temperature of the LED package 20. Then, the thermistor 30 transmits results of the detection, i.e., the temperature data to the LED control section 45, or more specifically, to an AD conversion circuit of the memory 46. Upon receiving the temperature data, the LED control section 45 controls the LED driver 40 in accordance with correction values, arranged in the look-up table determining a correction value of luminance of each LED contained in the LED package 20, which correspond to the temperature data stored in the memory 46, thereby adjusting the amount of emission (i.e., the luminance) of each LED. More specifically, as shown in FIGS. 10 and 11, the LED driver 40 includes a control circuit 41 and an FET 42 (electric current control transistor). In response to the control from the LED control section 45, the control circuit 41 uses the FET 42 to adjust an electric current that is applied to each LED mounted in the LED package 20, whereby the LED control section 45 adjusts the amount of emission of each separate LED.

A specific example of how the LED control section 45 adjusts the amount of emission of each LED through the LED driver 40 is, but is not limited to, pulse-width modulation (PWB). Specifically, the LED control section 45 reads, in accordance with the temperature data transmitted from the thermistor 30, values stored in the memory 46 inside of the LED control section 45, and adjusts the pulse-width of emission time, thereby making it possible to adjust an electric current that is applied to each LED. As mentioned above, the luminance of an LED decreases with an increase in temperature. Therefore, in cases where the temperature data indicates an increase in temperature of an LED, the LED control section 45 adjusts the pulse-width of emission time so that it becomes wider.

Thus, in the illumination device 2 in accordance with the present preferred embodiment, the temperature of each LED inside of the LED package 20 is detected by the thermistor 30, and the LED control section 45 controls the driving of each separate LED in accordance with the temperature data. As such, when used in combination with an area-active drive system (not shown), the illumination device 2 can realize a backlight high in contrast and low in power consumption. In other words, the liquid crystal display device 3 includes the illumination device 2 as a backlight and allows for area-active control.

Now then, in a light source module 1 provided in an illumination device 2, as shown in FIGS. 1A through FIG. 4, LED packages 20, thermistors 30, and LED drivers 40 (only FETs 42 by which the LED drivers 40 are constituted are shown in FIGS. 1A through FIG. 4) are disposed on the same substrate 10. As mentioned previously, the LED drivers 40 generate heat at the time of operation of the illumination device 2. For this reason, at the time of temperature detection, the thermistors 30 may be affected by the heat generated by the LED drivers 40. Accordingly, in order for the thermistors 30 to be able to accurately detect the temperatures (i.e., the temperature data) to be used as a benchmark for temperature correction of the LED packages 20, it is preferable that the thermistors 30 be disposed in such a position that they will hardly be affected by the heat generated by the FETs 42.

The following describes the light source module 1 with emphasis on the arrangement and configuration of the thermistors 30 in the light source module 1.

As shown in FIGS. 1A and 1B, the light source module 1 in accordance with the present preferred embodiment includes a substrate 10, LED packages 20, thermistors 30, and LED drivers 40 (only FETs 42 by which the LED drivers 40 are constituted are shown in FIGS. 1A and 1B). The following is an explanation of a configuration preferably using a thermistor as a temperature detecting section. Thermistors are less expensive than light sensors and the like. For this reason, using a thermistor as a temperature detecting section makes it possible to reduce the production cost of the light source module 1. It should be noted that the temperature detecting section (temperature detecting member) is not restricted to the thermistor, and can for example be a light sensor. In this case, it is possible to detect the temperature of an LED package by detecting the luminance of an LED with use of the light sensor.

In the light source module 1, as shown in FIGS. 1A and 1B, the LED packages 20 and the thermistors 30 are disposed on one surface of the substrate 10, and the LED drivers 40 including the FETs 42 (only the FETs 42 by which the LED drivers 40 are constituted are shown in FIGS. 1A and 1B) are disposed on the other surface of the substrate 10. In other words, that surface of the substrate 10 on which the LED packages 20 and the thermistors 30 are disposed and that surface of the substrate 10 on which the LED drivers 40 are disposed are different. This makes it possible to keep the thermistors 30 and the LED packages 20 away from the LED drivers 40 serving as heat sources. This enables the thermistors 30 to more accurately detect the temperature of heat transferred from the LED packages 20.

Further, it is preferable that, as shown in FIG. 1B, a heat dissipation sheet 80 (heat dissipation material) be provided on a surface of the substrate 10 opposite a surface on which the luminous LED packages 20 are disposed, in such a way as to be on the backside of an area in which the LED packages 20 are disposed. This makes it possible to efficiently dissipate the heat generated by the LED packages 20, and to prevent an increase in temperature of the LED packages 20.

The heat dissipation sheet 80 is not particularly limited as long as it has a heat dissipation effect. It is not particularly limited in shape, either.

The light source module 1 shown in FIG. 1A preferably has 32 LED packages 20, for example, disposed on the substrate 10 preferably in a 2×16 matrix, for example. Accordingly, on the substrate 10, 15 quadrangular areas determined by vertices corresponding to the LED packages 20 are formed. These quadrilateral areas are disposed in such a way as to be joined together one after another in a line. The thermistors 30 and the FETs 42 or the LED drivers 40 including the FETs 42 are disposed in mutually different areas among these quadrilateral areas. In the present preferred embodiment, an area in which a thermistor 30 is disposed is referred to as "area 50", and an area in which an FET 42 or an LED driver 40 including the FET 42 is disposed is referred to as "area 60". In other words and in accordance with the above, in the present preferred embodiment, a thermistor 30 and an FET 42 or an LED driver 40 including the FET 42 are disposed in a quadrilateral area 50 and a quadrilateral area 60, respectively.

In the light source module 1, as shown in FIG. 1A, the areas 50 and 60 are adjacent to one another. More specifically, on the substrate 10, the areas 50 and 60 are disposed alternately in a succession, as in the following order: "area 50, area 60, area 50, area 60, area 50, . . . ".

The thermistor 30 disposed in the area 50 may be configured so as to be able to detect the temperature of heat transferred from all of the four LED packages 20 respectively located at the vertices determining the quadrilateral area 50. However, the thermistor 30 is preferably configured so as to be able to detect the temperature of heat transferred equally from all of the four LED packages 20.

Figure 12:
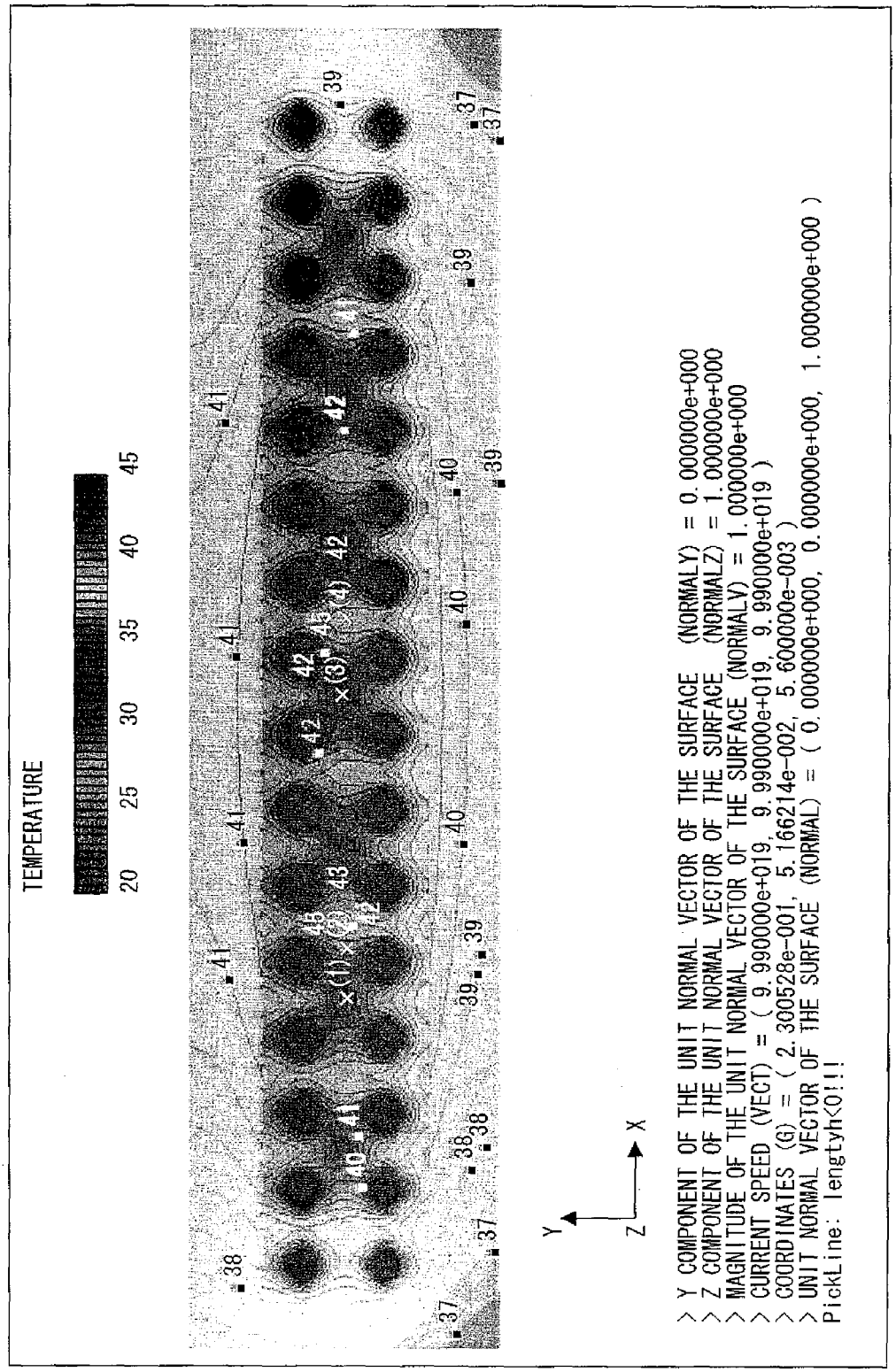
FIG. 12 shows the results of a simulation of diffusion of heat generated by each LED package mounted in an illumination device in accordance with a preferred embodiment of the present invention, the results being represented by isothermal lines.

FIG. 12 shows the results of a simulation of diffusion of heat generated by each of the LED packages 20, the results being represented by isothermal lines.

From the results shown in FIG. 12, it may be understood that the temperatures of a plurality of LED packages 20 can be measured by a single thermistor 30 by disposing a thermistor 30 in a polygonal area surrounded by LED packages 20 whose temperatures are to be corrected, i.e., a polygonal area defined by a plurality of LED packages 20 whose temperatures are to be corrected.

Further, from the results shown in FIG. 12, it may be understood that a thermistor 30 disposed in an area, among the polygonal areas determined by vertices corresponding to the LED packages 20, which is different from an area in which an FET 42 is disposed, is not affected by heat generated by the FET 42. Accordingly, the above configuration enables the thermistor 30 to accurately detect the temperature in the polygonal area in which the thermistor 30 is disposed.

With the present preferred embodiment, since each thermistor 30 is thus arranged so as to be able to detect the temperature of heat transferred from a plurality of LED packages 20, the number of thermistors 30 that are mounted in the light source module 1 may be smaller than the number of LEDs that are mounted in the light source module 1. This makes it possible to reduce the production cost of the light source module 1, and therefore of the illumination device 2 and of the liquid crystal display device 3.

Further, from the results shown in FIG. 12, it may be understood that when the thermistor 30 is at an equal distance from each of the LED packages 20, the thermistor 30 can equally detect the temperature of heat transferred from the four LED packages 20, without being biased toward any one of the four LED packages 20. Accordingly, it is preferable that the thermistor 30 be disposed near the circumcenter of the area 50. The phrase "near the circumcenter" is intended to mean, in addition to the circumcenter, an area near the circumcenter, i.e., an area located substantially at an equal distance from each of the vertices forming the polygon. The phrase "substantially at an equal distance" is meant to encompass, in addition to an equidistant range, a range that is not exactly equidistant but can be considered as equivalent to an equidistant range.

Accordingly, when the arrangement of the LED packages 20 whose temperatures are to be corrected is determined, the shape of the polygon is automatically determined. As explained above, the polygon is a quadrilateral when the number of LED packages 20 surrounding the thermistor 30 (more specifically, when the number of LED packages 20 disposed substantially at an equal distance from one thermistor 30, for example) is four, for example, and is a triangle when the number of LED packages 20 surrounding the thermistor 30 is three, for example.

Figure 2:
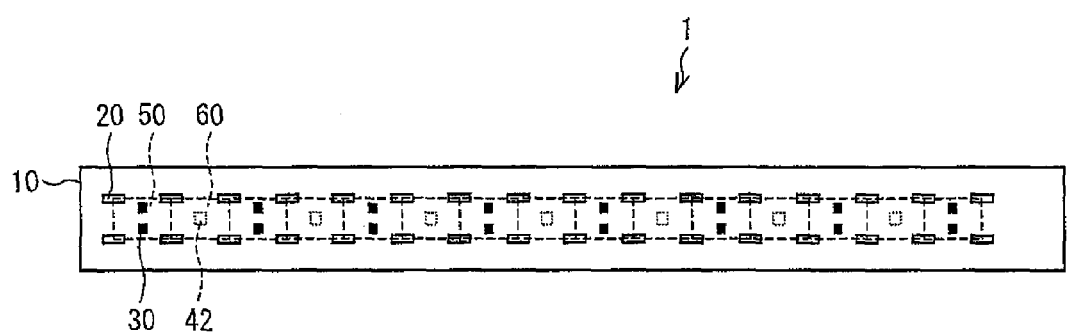
FIG. 2 is a plan view illustrating the configuration of a light source module that is provided in an illumination device in accordance with another preferred embodiment of the present invention.

However, as shown in FIG. 2, a plurality of thermistors 30 may be disposed in the area 50. In FIG. 2, two thermistors 30 are disposed in the area 50. In the present preferred embodiment, one to four thermistors 30 may be disposed in the area 50. More specifically, for example, in the case of a configuration in which the temperature in the vicinity of each separate one of the four LED packages 20 located at the vertices of the quadrilateral determining the area 50 is detected separately, four thermistors 30 may be disposed in the area 50; while in the case of a configuration in which the temperature in the vicinity of two LED packages 20 is detected by one thermistor 30, two thermistors 30 may be disposed in the area 50. Thus, an increase in the number of thermistors 30 that are disposed in the area 50 leads to an increase in the number of thermistor 30 per LED package 20 as compared to a situation in which one thermistor 30 is disposed in the area 50. For this reason, the temperature of heat transferred from the LED package 20 can be detected more accurately. Further, one area 50 may be equal to or different from another in the number of thermistors 30 that are disposed in each area 50.

As shown in FIG. 2, in the case of configuration including two thermistors 30 in the area 50, it is preferable that the two thermistors 30 be configured so that one of them can detect the temperature of heat transferred from two LED packages among the four LED packages located at the vertices of the quadrilateral determining the area 50 and the other can detect the temperature of heat transferred from the remaining two LED packages. In this regard, it is preferable that each of the two thermistors 30 be disposed at an equal distance from the two LED packages whose temperatures are to be detected by that thermistor 30. In addition, it is preferable that every one of the thermistors 30 be placed at an equal distance from an LED package 20. This enables each of the two thermistors 30 to more accurately detect the temperature of heat transferred from the LED packages 20 whose temperatures are to be detected by that thermistor 30.

Figure 4:
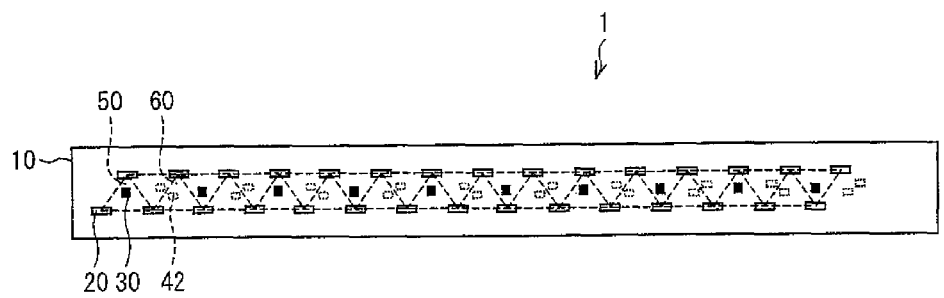
FIG. 4 is a plan view illustrating the configuration of a light source module that is provided in an illumination device in accordance with yet another preferred embodiment of the present invention.

Further, as shown in FIG. 4, a light source module 1 in accordance with another preferred embodiment can be configured such that a plurality of LED packages 20 define a deltaic configuration on the substrate 10. The term "deltaic configuration" here means that each area formed by connecting adjacent LED packages together is triangular. In FIG. 4, thirty LED packages 20, for example, form a deltaic configuration in two lines with a half-pitch offset, whereby thirty triangular areas determined by vertices corresponding to the LED packages 20 are formed, for example. In each of these triangular areas, a thermistor 30 or a FET 42 or an LED driver 40 including the FET 42 is disposed. In this preferred embodiment as well, an area 50 in which a thermistor 30 is disposed and an area 60 in which an FET 42 or an LED driver 40 including the FET 42 is disposed are adjacent to each other. Further, the thermistor 30 is disposed near the circumcenter of the triangular area 50. Such a configuration enables the thermistor 30 disposed in the area 50 to equally detect the temperatures of all of the three LED packages located at the vertices of the triangle determining the area 50. Further, in this preferred embodiment as well, a plurality of thermistors 30 may be disposed in the area 50.

As stated above, the FET 42 or the LED driver 40 including the FET 42 is disposed in the area 60. While the arrangement in the area 60 of the FET 42 or of the LED driver 40 including an FET 42 is not particularly limited, it is preferable that the FET 42 or the LED driver 40 including an FET 42 be disposed as far away as possible from the thermistor 30. Specifically, for example, as shown in FIG. 1A and FIG. 2, in a configuration in which the quadrilateral areas 50 and 60 are arrayed alternately to form a line, it is preferable that the FET 42 or the LED driver 40 including the FET 42 be disposed near the circumcenter of the area 60. Meanwhile, as shown in FIG. 4, in a configuration in which the thermistor 30 is disposed near the circumcenter of the triangular area 50, it is preferable that the FET 42 or the LED driver 40 including an FET 42 be disposed near the midway point between the thermistor 30 and a thermistor 30 adjacent thereto. This makes it possible to equalize and maximize the distance between each thermistor 30 and an FET 42 on the substrate 10. This enables every one of the thermistors 30 to accurately detect the temperature without being affected by heat generated by any FET 42.

As shown in FIGS. 10 and 11, the LED driver 40 includes the control circuit 41 and the FET 42. The LED driver 40 may be configured such that the control circuit 41 and the FET 42 are integrated, or may be configured such that the control circuit 41 and the FET 42 are separated. As stated above, during the operation of the illumination device 2, the LED driver 40 generates heat, or more precisely, the FET 42 provided in the LED driver 40 generates heat. Accordingly, when configured such that the control circuit 41 and the FET 42 are integrated, the LED driver 40 is wholly disposed in the area 60. Meanwhile, when configured such that the control circuit 41 and the FET 42 are separated, the LED driver 40 may be wholly disposed in the area 60, or only the FET 42 serving as a heat source may be disposed in the area 60.

Further, the number of LED drivers 40 that are disposed in each area 60 is not limited to one, and a plurality of LED drivers 40 may be disposed in each area 60. Specifically, the number of LED drivers 40 that are disposed in one area 60 may be set so that as many LED drivers 40 as needed to drive all the LEDs mounted in the LED packages 20 disposed in the light source module 1 are disposed on the substrate 10. Further, it is not necessary that one area 60 is equal to another in the number of LED drivers 40 that are disposed in each area 60. One area 60 may be different from another in the respect. For example, as shown in FIG. 3, there may be a configuration in which two LED drivers 40 are disposed in one area 60 while three LED drivers 40 are disposed in another area 60.

In FIG. 1A through FIG. 4, the light source module 1 is arranged such that the LED packages 20 form a matrix configuration or a delta configuration on the substrate 10. However, the present invention is not limited to such a configuration. This being said, it is preferable that the LED packages 20 be arranged regularly on the substrate 10. This makes it possible to place thermistors 30 and FETs 42 or LED drivers 40 including the FETs 42 at regular intervals. Such a configuration allows an improvement in optical uniformity of the illumination device 2.

Each of the preferred embodiments above has been described by way of example where the areas 50 and 60 are disposed alternately in a succession. However, the present invention is not limited to such an example, and the areas 50 and 60 are not necessarily provided alternately.

Figure 13:
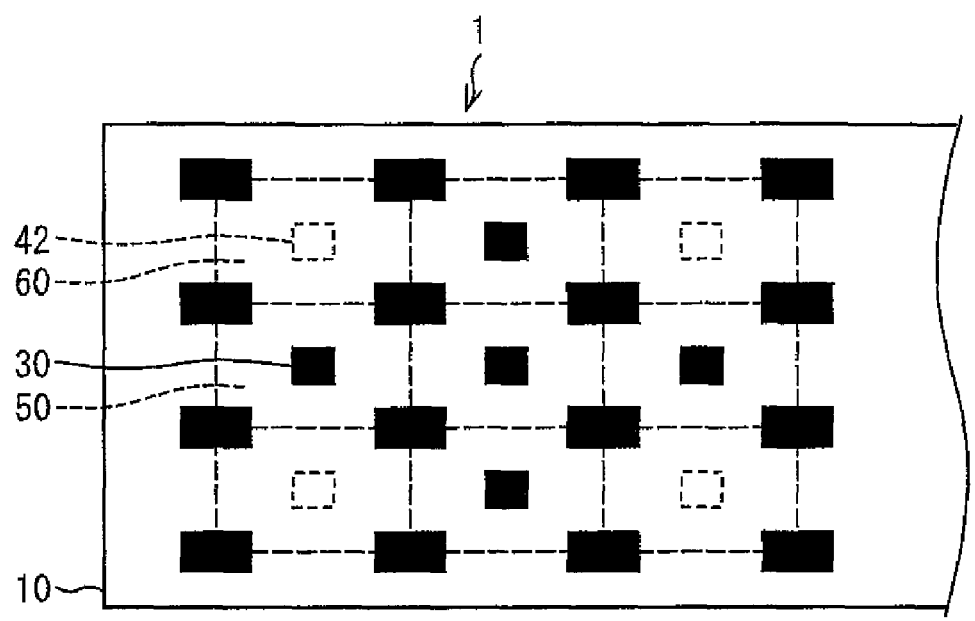
FIG. 13 is a plan view illustrating another example of the configuration of a light source module that is provided in an illumination device in accordance with yet another preferred embodiment of the present invention.

For example, when the LED packages 20 are provided in two or more lines as shown in FIG. 13, a plurality of areas 50 may be provided in a succession, for example, in such a way as to be surrounded by a plurality of areas 60.

Each of the preferred embodiments above has been described by way of example of configuration where, as shown in FIG. 1B, the heat dissipation sheet 80 is provided in a stripe shape along each line of LED packages 20 in such a way as to be on the back surface of the substrate 10 below an area in which the LED packages 20 are mounted, whereby each component is mounted in an area surrounded by LED packages 20.

However, the present invention is not limited to such an example, as long as the thermistor 30 is free of the influence of heat from an FET 42 in detecting temperature data that is to be used as a benchmark for temperature correction of each LED package 20 whose temperature is to be detected. In other words, the FET 42 only needs to be disposed outside of an area whose temperature is detected by the thermistor 30. Since the present preferred embodiment preferably uses one thermistor 30 for temperature correction of a plurality of LED packages 20, the FET 42 only needs to be basically provided outside of an area surrounded by LED 20 packages whose temperatures are to be corrected.

As evidenced by FIG. 12, the influence of heat from an FET 42 is extremely small in an area, among the plurality of polygonal areas determined by vertices corresponding to the LED packages 20, which is different from an area in which the FET 42 is disposed (i.e., outside of a polygonal area determined by vertices corresponding to the LED packages 20 surrounding the FET 42). In other words, a polygonal area in which a thermistor 30 is disposed is hardly affected by heat generated by an FET 42 disposed outside of the polygonal area, and the polygonal area in which no FET 42 is disposed may be considered as an area relatively small in temperature change that is caused by heat generated by the FET 42 during operation.

Accordingly, it is desirable that the FET 42 be disposed in the polygonal area determined by the vertices corresponding to the LED packages 20. However, the present invention is not limited to this configuration.

In other words, the illumination device in accordance with the present invention only needs to be configured such that the number of temperature detecting sections (e.g., thermistors 30) is reduced by disposing, in an area surrounded by a plurality of luminous bodies (e.g., LED packages 20) whose temperatures are to be corrected, temperature detecting sections smaller in number than the luminous bodies; no heat sources (e.g., FETs 42) other than the luminous bodies are disposed in the area in which the temperature detecting section is disposed.

In any case, as described above, an illumination device in accordance with various preferred embodiments of the present invention is not configured such that a driving section arranged to drive a luminous body and a temperature detecting section arranged to detect a temperature that is used as a benchmark for temperature correction of the luminous body are disposed adjacent to each other (specifically, in the same polygonal area as described above), nor is it configured such that the driving section and the temperature detecting section are respectively disposed on the front and back sides of the same substrate so as to be superposed. This prevents the temperature detecting section from detecting a temperature higher than the actual temperature of the luminous body under the influence of heat from the driving section and thus decreasing in accuracy of feedback of detected values from the temperature detecting section. Therefore, when used in combination with an area-active drive system, the illumination device in accordance with various preferred embodiments of the present invention can drive each separate LED in accordance with a video signal. For this reason, the illumination device can be used as a backlight high in contrast and low in power consumption. Further, for example, an ultraslim television or an ultraslim monitor can be realized by mounting such a backlight in a liquid crystal television or a liquid crystal monitor. Further, the present invention also encompasses light source modules provided in the illumination device and liquid crystal display device in accordance with the present invention.

As described above, an illumination device in accordance with the present preferred embodiment is configured such that a luminous body, a driving section arranged to drive the luminous body, and a temperature detecting section are disposed on a substrate. Further, a plurality of luminous bodies are disposed on the substrate. The temperature detecting section is disposed in an area surrounded by a plurality of luminous bodies, and the driving section is disposed outside of a polygonal area determined by vertices corresponding to the luminous bodies surrounding the temperature detecting section. Further, since the plurality of luminous bodies are disposed on the substrate, a plurality of polygonal areas determined by vertices corresponding to the luminous bodies are formed on the substrate. Preferably, the driving section and the temperature detecting section are respectively disposed in different ones of the polygonal areas. In addition, the temperature detecting section detects a temperature in the polygonal area in which the temperature detecting section is disposed. Accordingly, the temperature detecting section is not affected by heat generated by the driving section and is able to accurately detect a temperature in the polygonal area in which the substrate is disposed. The temperature in the polygonal area in which the substrate is disposed is correlated with the temperature of the luminous body. For this reason, the illumination device in accordance with the present preferred embodiment makes it possible to make temperature corrections with high efficiency and to exhibit a stable color temperature and luminance.

In the illumination device in accordance with the present preferred embodiment, the polygonal area in which the driving section is disposed and the polygonal area in which the temperature detecting section is disposed are preferably adjacent to each other.

In the illumination device in accordance with the present preferred embodiment, the luminous body, the driving section, and the temperature detecting section operate as a set. For this reason, the operation of the illumination device is controlled more easily when the luminous body, the driving section, and the temperature detecting section are disposed relatively close to one another on the substrate. According to the above configuration, the area in which the driving section is disposed and the area in which the temperature detecting section is disposed are adjacent to each other; therefore, the temperature detecting section can be disposed in such a position as not to be affected by heat from the driving section, while the luminous body, the driving section, and the temperature detecting section are being kept relatively close to one another on the substrate. For this reason, in the illumination device in accordance with various preferred embodiments of the present invention, operation control is easy and, based on temperature data detected by the temperature detecting section, the driving of the luminous body can be controlled more precisely by the driving section.

In the illumination device in accordance with the present preferred embodiment, the temperature detecting section is preferably disposed near a circumcenter of the polygonal area.

According to the above configuration, the temperature detecting section is disposed at a substantially equal distance from all the luminous bodies located at the vertices of the polygon delimiting the polygonal area. This enables the temperature detecting section to detect equally the temperature of heat transferred from the luminous bodies, without being biased toward any one of the luminous bodies. In the present specification, the phrase "near the circumcenter" refers to, in addition to the circumcenter (point), an area including the circumcenter.

In the illumination device in accordance with various preferred embodiments of the present invention, the driving section preferably includes a control circuit and an electric current control transistor, the electric current control transistor being disposed in the polygonal area in which the driving section is disposed.

According to the above configuration, the driving section includes the control circuit and the electric current control transistor. The electric current control transistor controls an electric current that is applied to the luminous body. While the driving section is in operation, the electric current control transistor generates heat. In the above configuration, the electric current control transistor is disposed in an area different from the area in which the temperature detecting section is disposed. For this reason, the temperature detecting section is able to accurately estimate the temperature of the luminous body without being affected by heat generated by the electric current control transistor.

In the illumination device in accordance with the present preferred embodiment, the luminous bodies and the temperature detecting section are preferably disposed on one surface of the substrate, and the driving section is disposed on a surface of the substrate opposite the surface on which the luminous bodies and the temperature detecting section are disposed.

The above configuration makes it possible to further distance the luminous body and the temperature detecting section from the driving section. Accordingly, the temperature detecting section is able to more accurately estimate the temperature of the luminous body with less influence of heat generated by the driving section. In addition to this, the luminous body can be prevented from being heated by the heat generated by the driving section.

In the illumination device in accordance with the present preferred embodiment, a heat dissipation material is preferably arranged on the substrate in such a way as to be on a backside of an area in which the luminous bodies are disposed.

According to the above configuration, the heat from the luminous body is dissipated by passing through the heat dissipation material. This makes it possible to prevent an increase in temperature of the heat generating body.

In the liquid crystal display device in accordance with various preferred embodiments of the present invention, the illumination device is preferably provided as a backlight.

The illumination device can efficiently make temperature corrections, thus exhibiting a stable color temperature and luminance. Accordingly, the above configuration makes it possible to achieve a liquid crystal display device stable in color temperature and luminance.

As described above, in various preferred embodiments of the present invention, a temperature detecting section arranged to detect the temperature of a luminous body is disposed in a position with relatively little influence of heat generated by the driving section that is arranged to drive the luminous body (heat generating body). This makes it possible to detect the temperature of the luminous body without being affected by the heat generated by the driving section, and to efficiently perform a temperature correction of emission of the luminous body. For this reason, preferred embodiments of the present invention can be used not only in various illumination devices typified by backlight devices or in the manufacturing field of such devices, but in addition, the preferred embodiments of the present invention can also be widely applied in the field of various display devices such as liquid crystal display devices and liquid crystal televisions.

The present invention being thus described, it should be noted that the same way may be varied in many ways. Such variations are not to be regarded as a departure from the spirit and scope of the present invention, and all such modifications as would be obvious to one skilled in the art are intended to be included within the scope of the following claims.

The invention claimed is:

1. An illumination device comprising:
a substrate;
a plurality of luminous bodies disposed on the substrate;
a driving section arranged to drive the plurality of luminous bodies; and
a temperature detecting section disposed in an area surrounded by the plurality of luminous bodies; wherein
a plurality of polygonal areas determined by vertices corresponding to the luminous bodies are located on the substrate, the driving section and the temperature detecting section are disposed in different ones of the polygonal areas, and the temperature detecting section is arranged to detect a temperature of the substrate in the polygonal area in which the temperature detecting section is disposed.

2. The illumination device according to claim 1, wherein the polygonal area in which the driving section is disposed and the polygonal area in which the temperature detecting section is disposed are adjacent to each other.

3. The illumination device according to claim 1, wherein the temperature detecting section is disposed near a circumcenter of the polygonal area.

4. The illumination device according to claim 1, wherein the driving section includes a control circuit and an electric current control transistor, the electric current control transistor being disposed in the polygonal area in which the driving section is disposed.

5. The illumination device according to claim 1, wherein:
the luminous bodies and the temperature detecting section are disposed on one surface of the substrate; and
the driving section is disposed on a surface of the substrate opposite to the surface on which the luminous bodies and the temperature detecting section are disposed.

6. The illumination device according to claim 1, wherein a heat dissipation material is provided on a surface of the substrate opposite to a surface of the substrate on which the luminous bodies are disposed so as to be on a backside of an area on the substrate in which the luminous bodies are disposed.

7. A liquid crystal display device comprising the illumination device according to claim 1 as a backlight.

* * * * *